June 26, 1923.
T. LEYTHAM
TEMPLE FOR EYEGLASSES
Filed Sept. 27, 1922
1,459,778
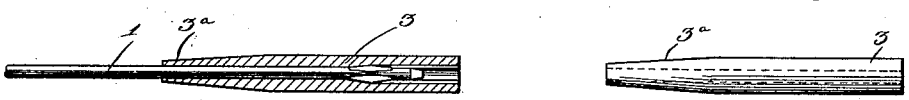
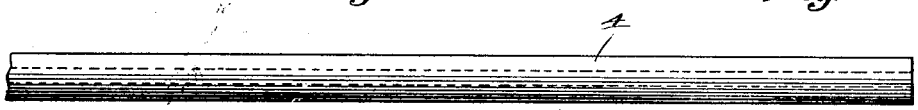
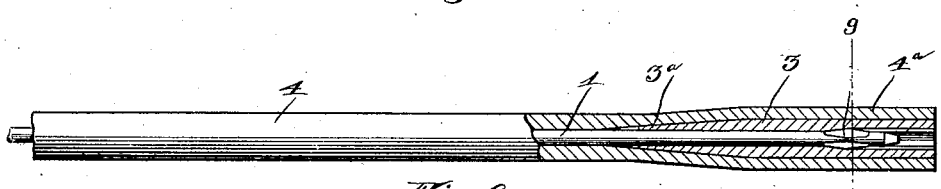
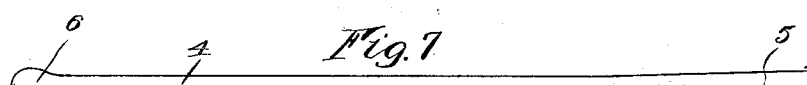
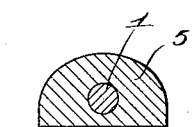
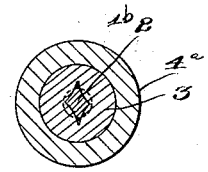
INVENTOR.
Thomas Leytham.
BY
his ATTORNEYS.

Patented June 26, 1923.

1,459,778

UNITED STATES PATENT OFFICE.

THOMAS LEYTHAM, OF ROCHESTER, NEW YORK, ASSIGNOR TO SHUR-ON OPTICAL COMPANY, INC., OF ROCHESTER, NEW YORK, A CORPORATION OF NEW YORK.

TEMPLE FOR EYEGLASSES.

Application filed Septemebr 27, 1922. Serial No. 590,971.

*To all whom it may concern:*

Be it known that I, THOMAS LEYTHAM, a citizen of the United States, and resident of Rochester, in the county of Monroe and State of New York, have invented certain new and useful Improvements in Temples for Eyeglasses, of which the following is a specification.

The present invention relates to a method of making temples for ophthalmic mountings and more particularly to that type of temple formed of non-metallic material, such as a cellulose compound, and reinforced by a longitudinally extending wire or metallic member. An object of this invention is to provide a temple which is free from cold shocks due to cutting and is capable of being bent cold without breaking. A further object of the invention is to provide a construction in which the central position of the reinforcing wire is not destroyed in the forming of the temple.

To these and other ends, the invention consists of certain parts and combinations of parts, all of which will be hereinafter described: the novel features being pointed out in the appended claims.

In the drawings:

Fig. 1 is a detail view of one end of the reinforcing wire;

Fig. 2 is a detail view of the filler sleeve or tube;

Fig. 3 is a detail view showing the filler tube or sleeve in section applied to the reinforced wire;

Fig. 4 is a detail view of the tubular member from which the main body of the temple is formed;

Fig. 5 is a detail view showing the manner in which the tubular body member, shown in Fig. 4, is expanded;

Fig. 6 is a view partially in section showing the manner in which the reinforcing wire and its filler sleeve or tube are associated with the main body tube of the temple;

Figs. 7 and 8 are, respectively, an outer face and edge view of the temple after it has been pressed into shape;

Fig. 9 is an enlarged section on the line 9—9; Fig. 6; and

Fig. 10 is an enlarged section on the line 10—10, Fig. 8.

Heretofore in making temples of non-metallic material, such as cellulose compound, with a metallic reinforcement, the most general practice has been to put the reinforcing wire in a tube of the cellulose compound and thereafter to place the reinforced tube in dies which cut and press the temple into the desired shape. This cutting and pressing action has many disadvantages. First of all, it requires that some of the material be removed throughout the greater length of the temple while at the end portions more material must be provided owing to the greater size at these points. This requires that the cutting and pressing tools work the material in a cold state more than is desirable and therefore cold shocks are given to the cellulose compound which, when the temple is bent, tend to cause the breaking of the same. Furthermore, the cutting tends to decentralize the reinforcing wire and in many instances to expose the latter. According to this invention the forming of the reinforced member is practically a molding action, so that the cutting is reduced to a minimum and the completed temple is free from cold shocks and can be bent cold without breaking. At the same time, the decentralization of the reinforcing wire or member does not occur.

An example of the manner in which this invention may be carried out consists in providing a reinforced wire 1 of slightly less length than the temple to be made, with a non-circular portion 2 at one end. On this non-circular end, a short filling sleeve 3 of non-metallic material is provided, which has a tapered end 3ª, the sleeve being illustrated in Fig. 2 and its application to the reinforcing wire being shown in Fig. 3. There is also provided a tubular member 4 of non-metallic material, such as cellulose compound, and this tubular member is expanded at 4ª at one end, as illustrated in Fig. 5. The reinforcing wire 1 with the filling sleeve 3 thereon is fitted in the tubular body 4, while the filling piece 3 lies in the expanded end 4ª as shown in Fig. 6 of the drawings. It is preferred to unite the filling piece 3 with the interior walls of the expanded portion 4ª by a cement which will substantially make these two parts a homogeneous structure.

After the parts have been associated in the manner illustrated in Fig. 6, they are subjected to a molding action which forms the temple to a shape similar to that shown in Figs. 7 and 8, where one end 5 is tapered and the opposite end is in substantially the form of a half-cylinder 6, due to one side 7 of the temple being flat. In shaping the temple from the form shown in Fig. 6 to that shown in Fig. 7, the material is not required to flow to any great extent, as the insert provided from the enlargement at the inner end of the temple, while the cross section of the greater portion of the temple is readily formed into the substantially half-cylindrical shape without decentralizing the reinforced wire, thus doing away with cold shocks to the cellulose compound and making it possible to bend the temple while in a cold condition without breaking.

What I claim as my invention and desire to secure by Letters Patent is:

1. The method of forming temples for ophthalmic mountings which consists in expanding a tubular body member at one end, inserting into the tubular body member a reinforcing wire substantially throughout the length of the latter and a filling piece in the expanded end, and molding the parts to the desired shape.

2. A method of making temples from ophthalmic mountings which consists in expanding one end of a tubular member of non-metallic material, inserting in said tubular member the reinforced wire with a filler tube fitted to one end thereof to fill the expanded portion of the first mentioned tubular member, and forming the tubular member with the parts therein to the desired shape.

THOMAS LEYTHAM.